(12) United States Patent
Kazmierczak et al.

(10) Patent No.: US 6,549,379 B1
(45) Date of Patent: Apr. 15, 2003

(54) UNIFIED DISC DRIVE TOP COVER AND VOICE COIL MOTOR POLE

(75) Inventors: Frederick F. Kazmierczak, San Jose, CA (US); Sharon M. Jenness, Livermore, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 206 days.

(21) Appl. No.: 09/717,515

(22) Filed: Nov. 20, 2000

Related U.S. Application Data

(60) Provisional application No. 60/180,747, filed on Feb. 7, 2000.

(51) Int. Cl.[7] .................................................. G11B 5/55
(52) U.S. Cl. ................................................... 360/264.8
(58) Field of Search ........................... 360/264.8, 264.9, 360/266.7, 266.8

(56) References Cited

U.S. PATENT DOCUMENTS

| | | |
|---|---|---|
| 5,109,310 A | 4/1992 | Ohkjita et al. |
| 5,262,912 A | 11/1993 | Hudson et al. |
| 5,315,466 A | 5/1994 | Nishimoto et al. |
| 5,483,400 A * | 1/1996 | Tsujino .................... 360/264.8 |
| 5,636,091 A | 6/1997 | Asano |
| 5,654,848 A | 8/1997 | Maiers et al. |
| 5,808,838 A * | 9/1998 | Battu ....................... 360/264.8 |
| 6,047,459 A | 4/2000 | Fahley et al. |
| 6,125,016 A * | 9/2000 | Lin .......................... 360/264.8 |
| 6,347,023 B1 * | 2/2002 | Suwa ....................... 360/264.8 |

* cited by examiner

*Primary Examiner*—A. J. Heinz
(74) *Attorney, Agent, or Firm*—Merchant & Gould P.C.

(57) ABSTRACT

A disc drive is disclosed that incorporates a voice coil motor pole into the drive cover. The disc drive has an actuator assembly mounted adjacent the storage disc that carries a trasducer at one end for transferring data to and from the disc, and a voice coil motor for rotating the actuator arm to position the transducer. The voice coil motor has a movable coil fastened to an opposite end of the actuator arm and a pair of stationary magnets positioned adjacent the voice coil in a side-by-side relation. A cover on the baseplate encloses the actuator assembly and the data storage disc and a portion of magnetically permeable material of the cover forms a top pole for the pair of magnets.

13 Claims, 8 Drawing Sheets

UNIFIED DISC DRIVE TOP COVER AND VOICE COIL MOTOR POLE

RELATED APPLICATIONS

This application claims the benefit of priority of U.S. Provisional Patent Application Serial No. 60/180,747, filed Feb. 7, 2000.

FIELD OF THE INVENTION

This invention generally relates to computer disc drives and more particularly to a disc drive having a top cover that also performs the function of a voice coil motor pole.

BACKGROUND OF THE INVENTION

The effort to make personal computers more compact has created demand to reduce the size of the disc drive used in personal computers. A major innovation in this direction has been the development of smaller, Winchester-type disc drives (hard disc drives) as replacements for floppy disc drives. Hard disc drives generally provide higher capacities and faster speeds of operation than floppy disc drives, factors which are of great importance for effective use of personal computers running advanced software packages. Many of these disc drives use voice coil motors for positioning a read/write transducer head over a selected track on the rotating hard disc.

The popularity of notebook computers and the advent of hand held computers has led to still another push to reduce the size of hard disk drives. Recently, efforts have been made to reduce the height of hard disc drives, so that the size of the housing for the computer could be minimized. However, further reduction of the physical size of a hard disc drive is constrained by the hard disc drive's functional requirements. For example, the conventional voice coil motor requires at least two stationary magnets, a voice coil, a top pole, a bottom pole, and clearance space between each of these components. The size of these components may be minimized, but the components themselves may not be eliminated, unless the functionality of the components is provided by some other means.

A voice motor coil includes a magnetic circuit that creates a magnetic field operative to move an actuator assembly on which the read/write heads reside. Generally, a voice coil motor includes a top pole, a bottom pole, and a voice coil that moves between the poles. The top and bottom poles hold magnets, thereby creating a magnetic field therebetween. The poles function to provide magnetic paths, such that the magnets are in the magnetic paths with a cross flux to the coil. The voice coil motor moves when the voice coil is energized within the magnetic field. The actuator assembly moves when the voice coil is energized, thereby moving the read/write heads attached thereto.

A conventional disc drive 100 is depicted in FIG. 1. The disc drive 100 includes a base 120 to which various components of the disc drive 100 are mounted. A top cover 106, shown partially cut away, cooperates with the base 120 to form an internal, sealed environment for the disc drive in a conventional manner. A printed circuit board 102 is fastened to the underside of the baseplate 120. The internal components include a spindle motor 112 that rotates one or more discs 108 at a constant high speed. Information is written to and read from tracks on the discs 108 through the use of an actuator assembly 111, which rotates during a seek operation about a bearing shaft assembly 113 positioned adjacent the discs 108. The actuator assembly 111 includes a plurality of actuator arms 115 which extend towards the discs 108, with one or more flexures 116 extending from each of the actuator arms 115. Mounted at the distal end of each of the flexures 116 is a read/write head 118 (transducer) that includes an air bearing slider enabling the head 118 to fly in close proximity above the corresponding surface of the associated disc 108. During a seek operation, the track position of the head 118 is controlled through the use of a voice coil motor (VCM) 114.

A cross-sectional view of a conventional VCM is depicted in FIG. 2. Referring to FIGS. 1 and 2, the conventional VCM 114 includes a coil 126 attached to the actuator assembly 111. The conventional VCM also includes one or more bi-polar, stationary magnets 128 that establish a magnetic field in which the coil 126 is immersed. The controlled application of current to the coil 126 causes magnetic interaction between the stationary magnets 128 and the coil 126 so that the coil 126 moves in accordance with the well-known Lorentz relationship. The paths of the magnetic field are directed through a top pole 202 and a bottom pole 204 located above and below the voice coil 126. The top pole 202 and the bottom pole 204 are made of a magnetic permeable material, such as iron or steel. As the coil 126 moves in the magnetic field between the poles, the actuator assembly 111 pivots about the bearing shaft assembly 112, and the heads 118 are caused to move across the surfaces of the discs 108.

As discussed, the voice coil motor 110 includes an energizable coil 126 coupled to the actuator assembly 111 and a magnet assembly 200 coupled to the base 120 of the disc drive. In the disc drive depicted, the magnet assembly 200 includes a top pole plate and a bottom pole plate 202, 204. The poles 202, 204 are supported in spaced relation by at least two spacers 206 to form a gap 208 therebetween. The stationary magnets 128 are supported by the poles 202, 204 to form a permanent magnetic field in the gap 208. The poles 202, 204 support the bi-polar stationary magnets 128 to form two bi-directional flux paths 210, 212 for operation of the voice coil motor. The coil 126 extends into the gap 208 in alignment with the flux paths 210, 212 for generating a rotating force for operating the actuator assembly 111 proportional to current flowing through the coil 126.

There is a continual need for a smaller, simpler and more compact disc drive. One approach is to reduce the height of the disk drive. This may involve eliminating one or more of the parts of the voice coil motor (VCM) circuit. However, this approach still requires a complete magnetic circuit. Accordingly, there is a need for a low-height disc drive that reduces the overall height of the disc drive and yet is fully functional.

SUMMARY OF THE INVENTION

Against this backdrop the present invention has been developed. A low-height disc drive has a digital data storage disc rotatably mounted on a drive motor fastened to a base plate rotating the storage disc. The disc drive further includes an actuator assembly mounted to the base plate adjacent the storage disc, the actuator assembly including an actuator arm carrying a transducer for transferring data to and from the disc. The disc drive has a voice coil motor for rotating the actuator assembly to position the transducer with respect to the storage disc. The voice coil motor includes a voice coil fastened to the actuator arm, a stationary magnet attached to a bottom pole on the base plate in spaced, confrontational arrangement with a top pole defining a horizontal gap between the stationary magnet and the top pole through which the voice coil moves.

The hard disc drive of the present invention was specifically designed to be compact yet fully functional. The hard disc drive of the present invention has a magnetically-permeable top cover that functions as the top pole for the magnetic circuit of the voice coil motor (VCM). This functionality eliminates the need for a separate top pole for the VCM's magnetic circuit. Because the need for the separate VCM pole has been eliminated, the hard disc drive can be manufactured such that it is more compact and less expensive than hard disc drives requiring a separate pole.

Alternatively, the top cover can be made of thin magnetically permeable material and folded in an accordion-like manner to provide the magnetic characteristics required to function as a top pole.

These and various other features as well as advantages which characterize the present invention will be apparent from a reading of the following detailed description and a review of the associated drawings.

DETAILED DESCRIPTION

Figure 1:
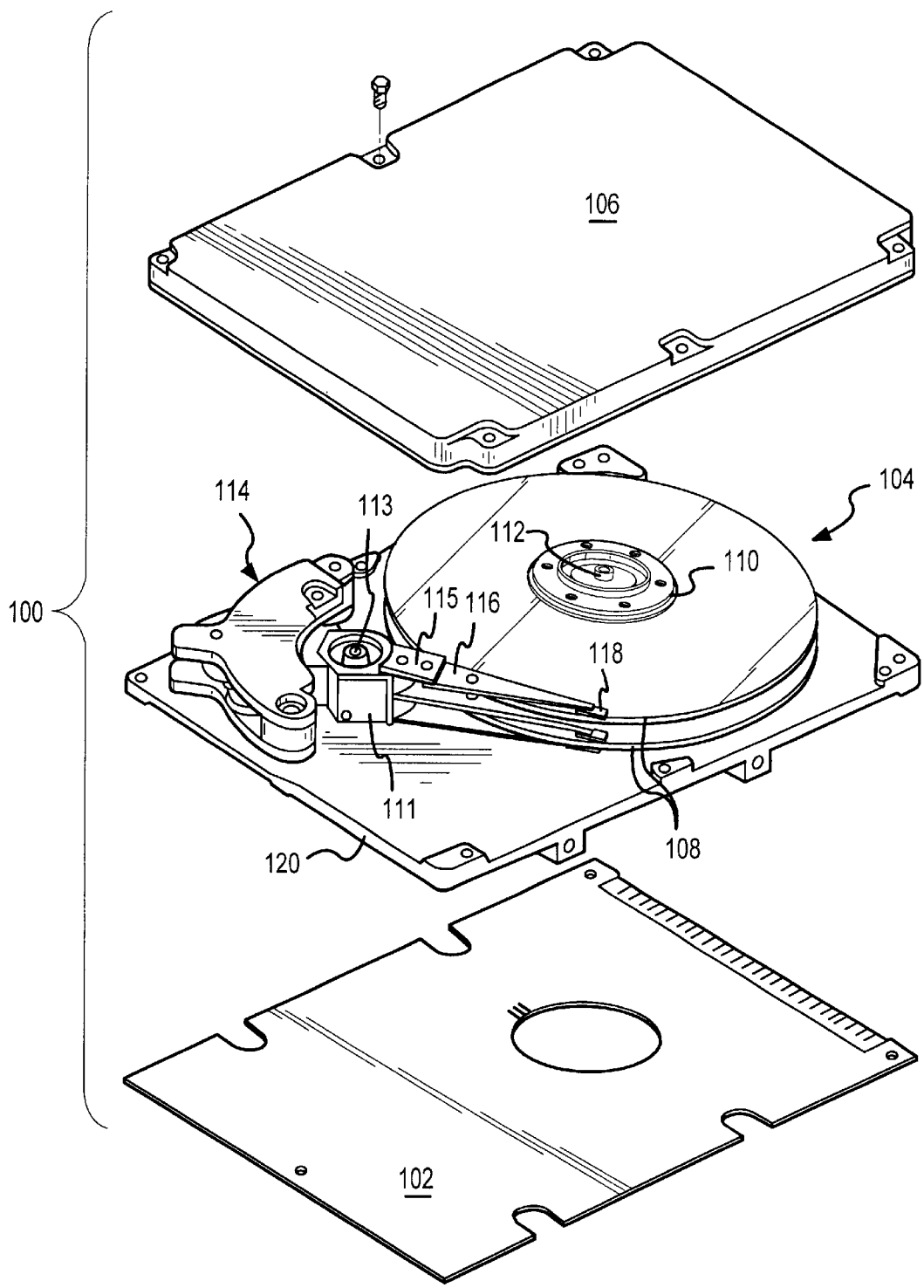
FIG. 1 is an exploded perspective view of a conventional disc drive incorporating a voice coil motor.
Figure 2:
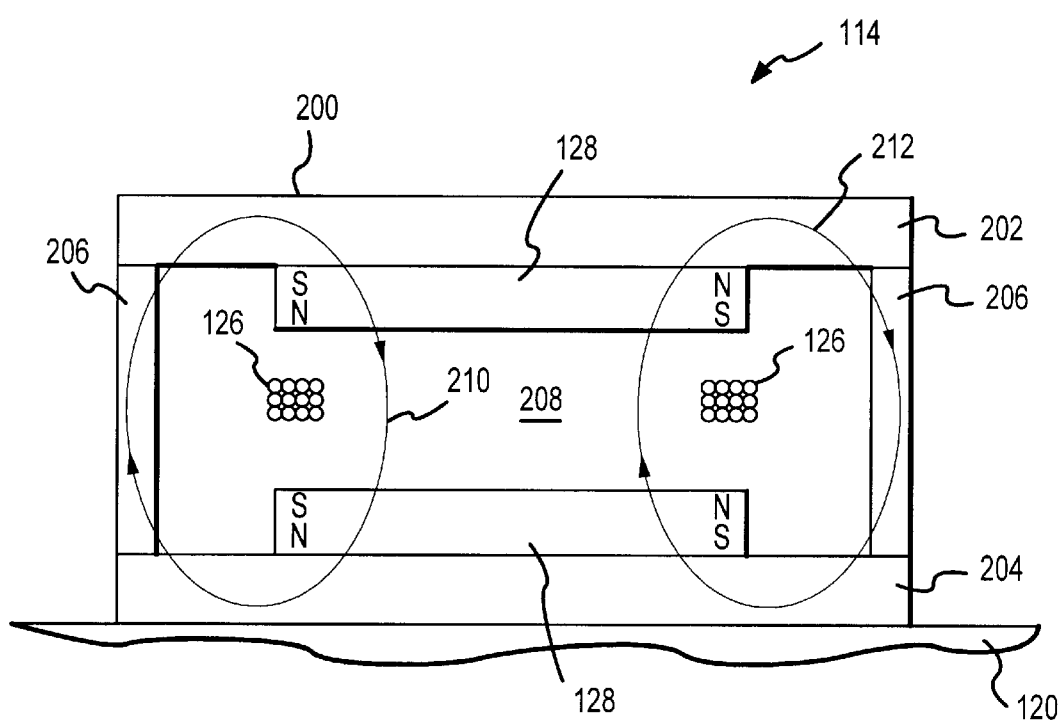
FIG. 2 is a simplified cross sectional view of a conventional voice control motor.
Figure 3:
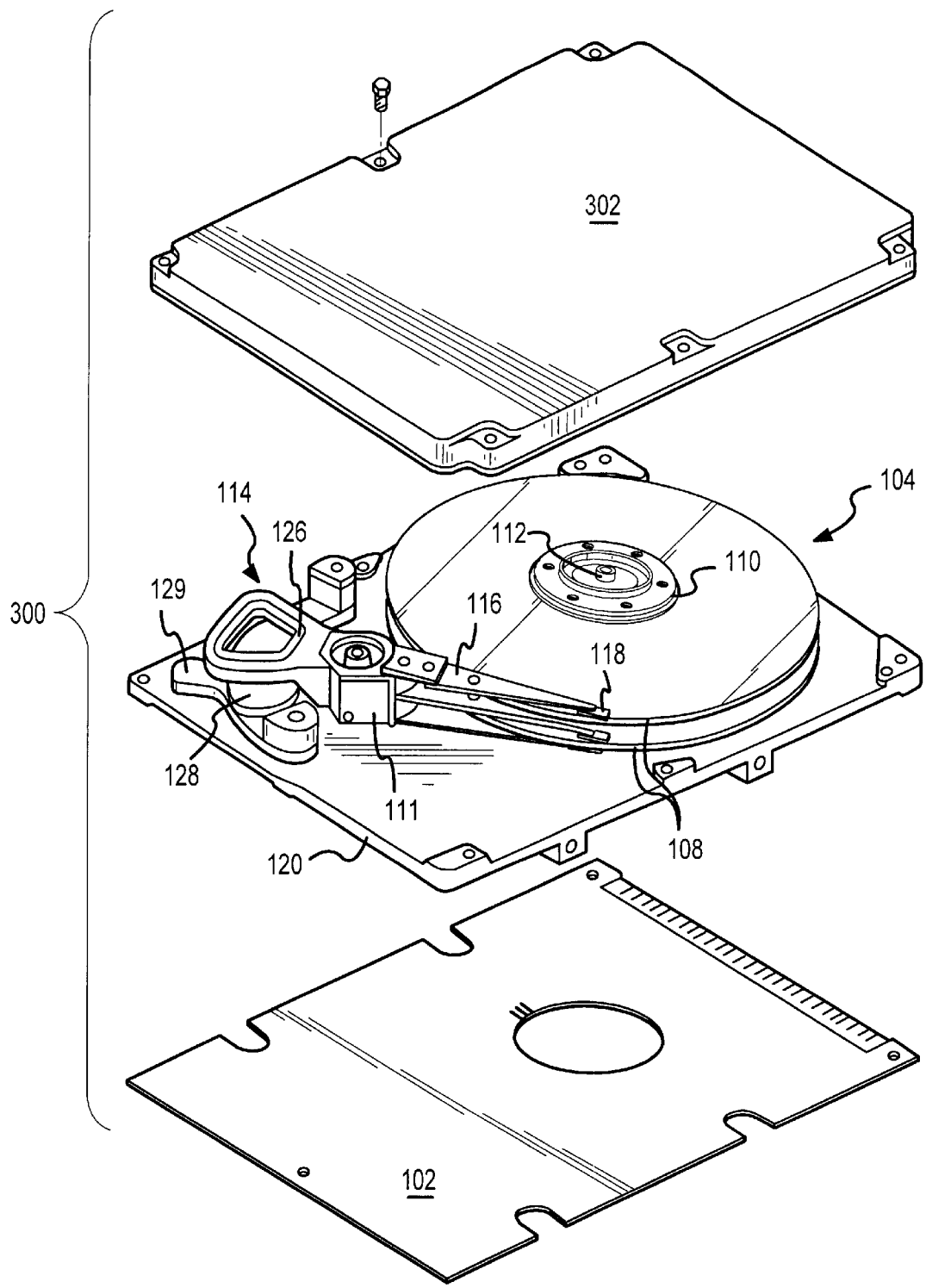
FIG. 3 is an exploded perspective view of a disc drive incorporating a thick top cover that function as a top pole for a voice control motor, in accordance with an exemplary embodiment of the present invention.

FIG. 3 is an exploded perspective view of a low-height disc drive 300, built in accordance with an exemplary embodiment of the present invention. The disc drive 300 incorporates a voice coil motor having a top cover that operates as a top pole. The disc drive depicted in FIG. 3 has a top cover 302 that functions as a top pole, thereby eliminating the need for a separate top pole, by providing a unified top cover 302 and voice coil motor top pole. The track position of the heads 118 is controlled through the use of a voice coil motor (VCM) 114, which typically includes a coil 126 attached to the actuator assembly 111, a bottom stationary magnet 128, a top stationary magnet (not shown), and a bottom pole 129 to establish a magnetic field in which the coil 126 is immersed. The top cover 302 is built of a thick, magnetically permeable material and, thus, can function as a top pole. The controlled application of current to the coil 126 causes magnetic interaction between the stationary magnets 128, the top cover 302, the bottom pole 129, and the coil 126 so that the coil 126 moves in accordance with the well-known Lorentz relationship. The top cover 302 operates as a top pole to complete the magnetic circuit of the VCM.

The disc drive.design of FIG. 3 is more compact than a conventional disc drive, because the functionality of the top pole of the VCM of a conventional disc drive is provided by the top cover 302, thereby enabling the elimination of a separate top pole. The elimination of the top pole and the clearance space normally found between the top pole and the top cover 302 permits a low-height disc drive design and reduces the materials and labor costs associated with a separate top pole. The top cover 302 of this design is made of a magnetically permeable material, such as steel. In order to serve as the top pole, the top cover 302 must be thick enough to provide the magnetic properties necessary to complete the magnetic circuit of the voice coil motor. The design of FIG. 3 eliminates the need for additional labor or additional parts, associated with equipping a conventional disc drive with a separate top pole piece.

Figure 4:
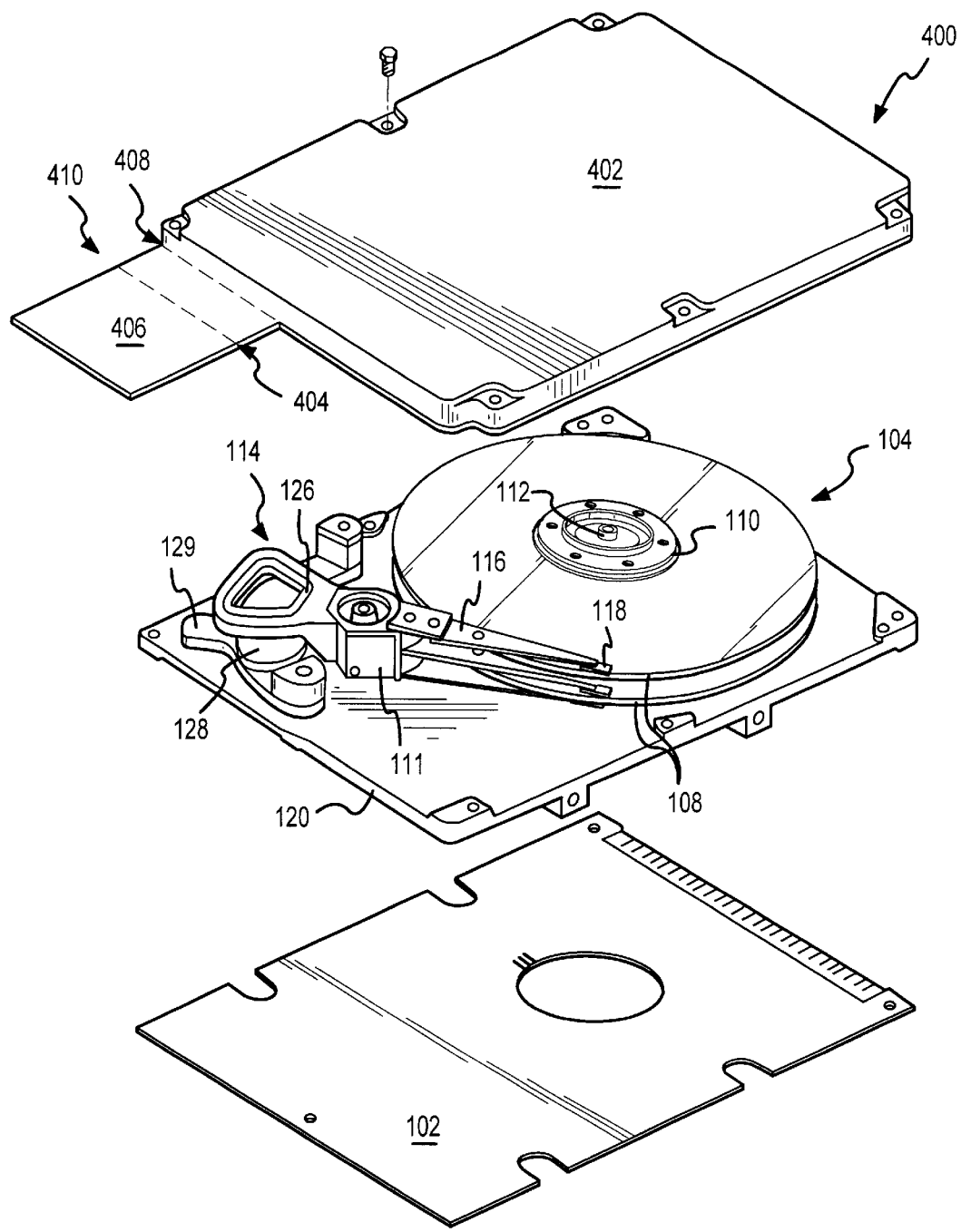
FIG. 4 is an exploded perspective view of a disc drive incorporating a top cover with a tab that function as a top pole for a voice control motor, in accordance with another exemplary embodiment of the present invention.

FIGS. 4–8 depict exploded perspective views of disc drives incorporating alternative embodiments of top covers that function as top poles in accordance with the present invention. FIG. 4 depicts a low-height disc drive 400 that is an exemplary embodiment of the present invention in which a top cover 402 is provided with a peripheral tab 410. The top cover 402 and the tab 410 can be made of a single, thin sheet of magnetically permeable material, such as steel. The tab 410 can be folded back over the top cover 402 along two bend lines 404 and 408. Bending the tab 410 along the bend lines 404, 408 enables a flat portion 406 of the tab to be laid flat upon (i.e., in substantially parallel alignment with) top cover 402. The combination of the top cover 402 and the flat portion 406 provides a thick magnetically permeable region over the area of the disc drive in which the VCM 114 is located.

Figure 5:
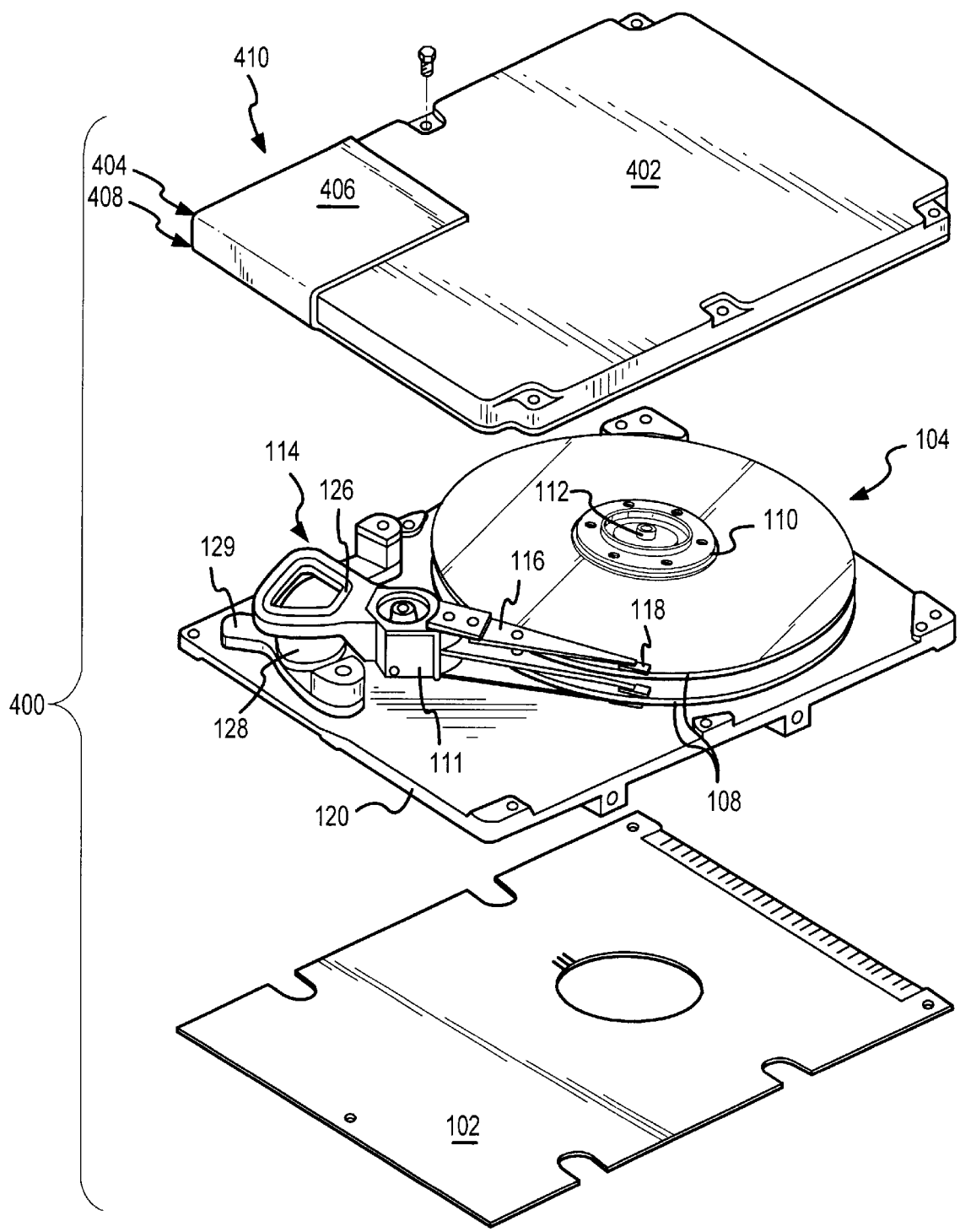
FIG. 5 is an exploded perspective view of a disc drive incorporating a top cover with a folded tab that function as a top pole for a voice control motor, in accordance with another exemplary embodiment of the present invention.

FIG. 5 depicts the tab 410 bent along the bend lines 404, 408 so that the flat portion 406 lies substantially flat upon the top surface of the top cover 402. In this configuration, the tab 410 operates to effectively double the thickness of the top cover 402 in the area above the VCM 114. Increasing the thickness of the top cover 402 increases the ability of the top cover 402 to function as the top pole of VCM 114, by increasing the amount of magnetic flux that the top cover can accommodate. Advantageously, the bent tab configuration of FIG. 5 provides an inexpensive means for reducing the overall height of a disc drive (by eliminating the need for a separate top pole), while minimizing material and labor costs. The tab 410 may be constructed from the same sheet of magnetically permeable material used to form the remainder of the top cover 402.

The disc drive 400 depicted in FIG. 5 has a top cover 402 that functions, in conjunction with the flat portion 406, as a top pole, thereby eliminating the need for an separate top pole, by providing a unified top cover 402 and VCM top pole. The track position of the heads 118 is controlled through the use of VCM 114, which typically includes a coil 126 attached to the actuator assembly 110, a top magnet (not shown), a bottom magnet 128, and a bottom pole 129 to establish a magnetic field in which the coil 126 is immersed. The top cover 402 and the flat portion 406 are built of a magnetically permeable material, such as steel, and function together as a top pole to complete the magnetic circuit of the VCM 114. The controlled application of current to the coil 126 causes magnetic interaction between the magnets 128, the top cover 402, the bottom pole 129, and the coil 126 so that the coil moves in accordance with the well-known Lorentz relationship.

Figure 6:
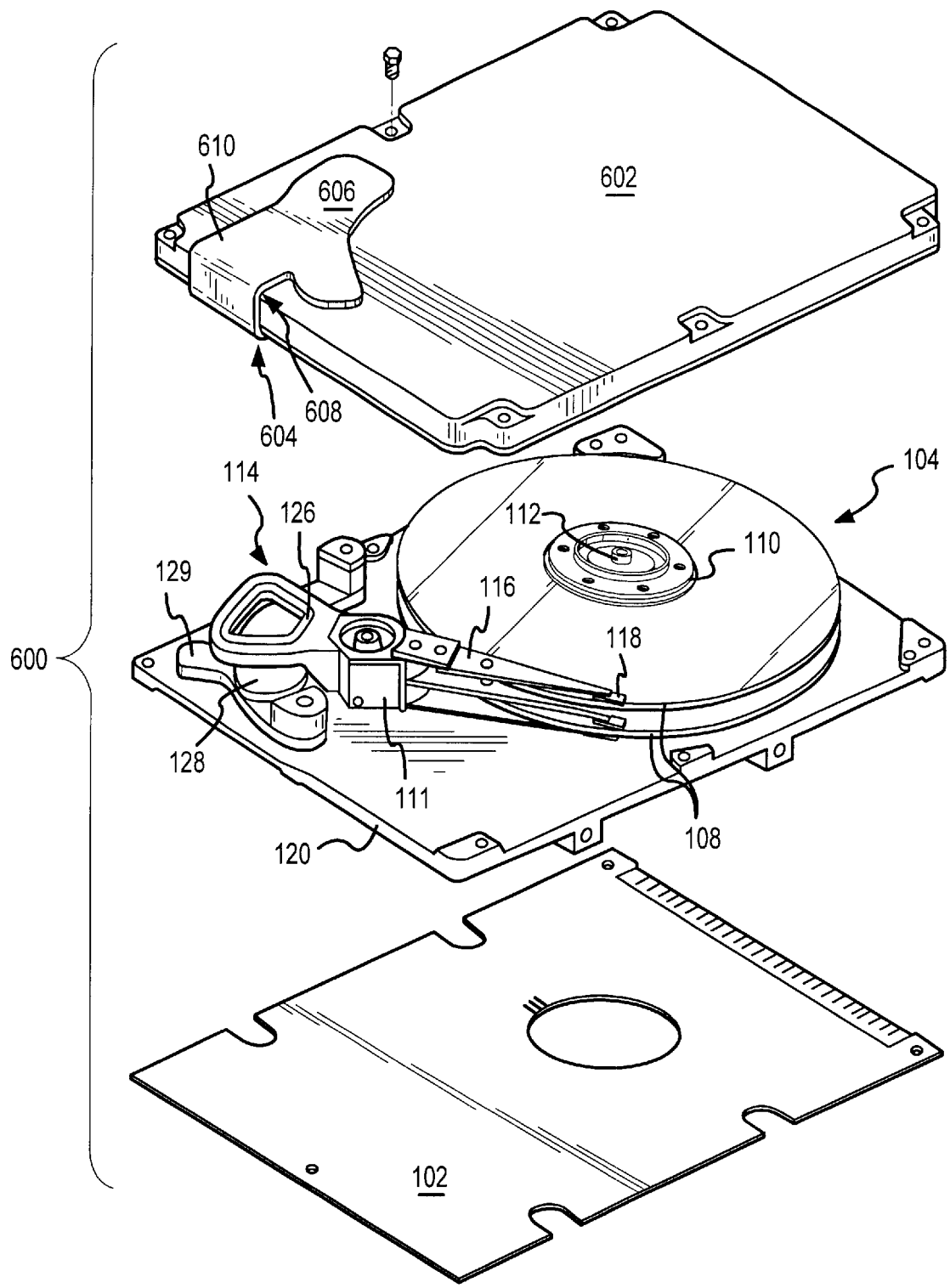
FIG. 6 is an exploded perspective view of a disc drive incorporating a top cover with a shaped, folded tab that function as a top pole for a voice control motor, in accordance with a further exemplary embodiment of the present invention.

FIG. 6 depicts a low-height disc drive 600 that is another exemplary embodiment of the present invention in which a top cover 602 is provided with a tab 610. The tab 610 is bent along two bend lines 604 and 608 so that a flat portion 606 lies substantially flat upon the top surface of the top cover 602. In this configuration, the tab 619 operates to effectively double the thickness of the top cover 602 in the area above the VCM 114. Increasing the thickness of the top cover 602 again increases the ability of the top cover 602 to function as the top pole of VCM 114, by increasing the amount of magnetic flux that the top cover can accommodate. In this embodiment, the flat portion 606 of the tab 610 is shaped to substantially the same shape as that of the bottom pole 129. Thus, the magnetic material used to form the top cover 602 can be minimized. By shaping the flat portion 606 like the bottom pole 129, the top cover 602 provides the increased magnetic flux capacity in precisely the region that it is needed: directly over the bottom pole 129. Advantageously, the bent tab configuration of FIG. 6 provides an inexpensive means for reducing the overall height of a disc drive—by eliminating the need for a separate top pole—while minimizing material and labor costs.

Figure 7:
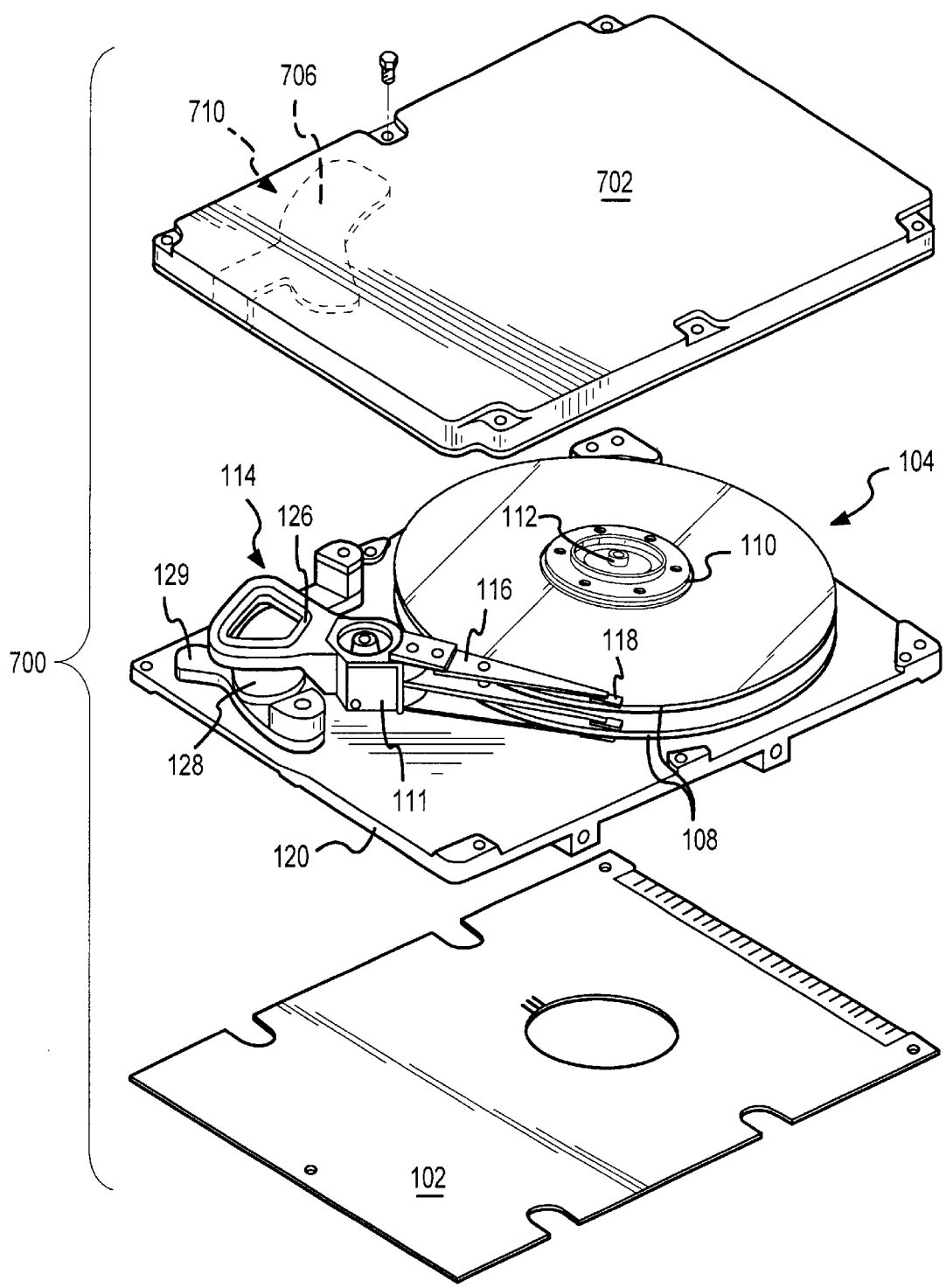
FIG. 7 is an exploded perspective view of a disc drive incorporating a top cover with a shaped folded tab that function as a top pole for a voice control motor, in accordance with a still further exemplary embodiment of the present invention.

FIG. 7 depicts a low-height disc drive 700 that is a further exemplary embodiment of the present invention in which a top cover 702 is provided with a tab 710. The tab 710 is similar to the tab 610 in FIG. 6, except that the tab 710 is folded under so as to be located adjacent the bottom surface of the top cover 702. The tab 710 is bent so that a flat portion 706 lies substantially flat below and preferably against the bottom surface of the top cover 702. In this configuration, the tab 710 operates to effectively double the thickness of the top cover 702 in the area above the VCM 114. Increasing the thickness of the top cover 702 increases the ability of the top cover 702 to function as the top pole of VCM 114, by increasing the amount of magnetic flux that the top cover can accommodate. In this embodiment, the flat portion 706 of the tab 710 is shaped to substantially the same shape as that of the bottom pole 129. Thus, the magnetically permeable material used to form the top cover 702 can be minimized. By shaping the flat portion 706 like the bottom pole 129, the top cover 702 provides the increased magnetic flux capacity in precisely the region that it is needed: directly over the bottom pole 129. Advantageously, the bent tab configuration of FIG. 7 provides an inexpensive means for reducing the overall height of a disc drive—by eliminating the need for a separate top pole—while minimizing materials and labor costs. In addition, bending the tab 710 to the inside of the top cover 702 reduces the risk that the tab 710 will be damaged or distorted during use.

Figures 8, 9:
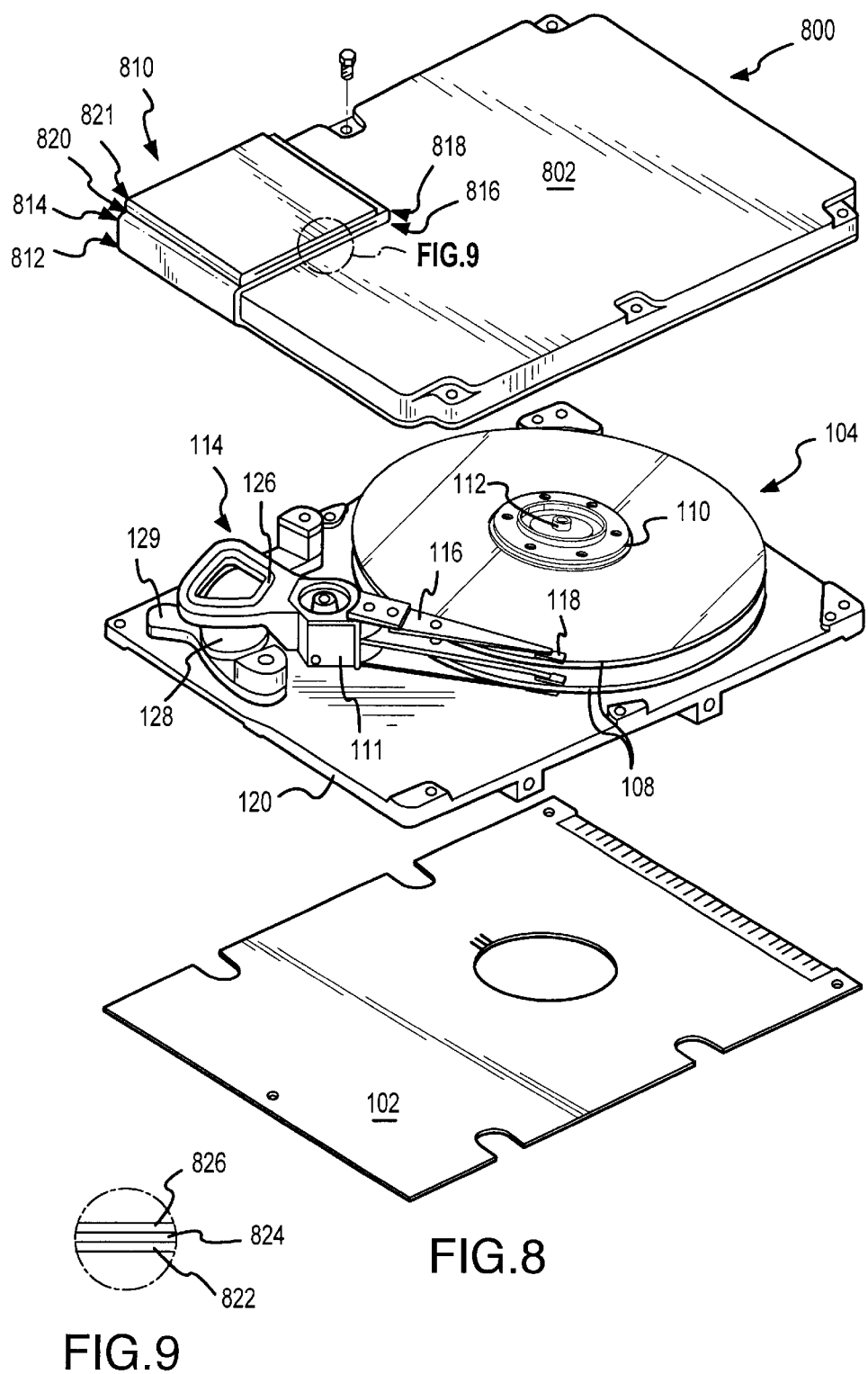
FIG. 8 is an exploded perspective view of a disc drive incorporating a top cover with an accordion-folded tab that function as a top pole for a voice control motor, in accordance with still another exemplary embodiment of the present invention.
FIG. 9 is a side view of tab 810 in FIG. 8.

FIG. 8 depicts a low-height disc drive 800 that is a still further exemplary embodiment of the present invention in which a top cover 802 is provided with a tab 810. The tab 810 is bent along two bend lines 812 and 814 so that a first flat portion 822 lies substantially flat upon the top surface of the top cover 802. The tab 810 is further bent back over itself along two other bend lines 816 and 818 so that a second flat portion 824 lies substantially flat upon the first flat portion 822 and parallel to the top surface of the top cover 802. The tab 810 is yet again bent back over itself along two other bend lines 820 and 821 so that a third flat portion 826 lies substantially flat upon the second flat portion 824 and parallel to the top surface of the top cover 802. The tab 810 thus has an accordion-like configuration that effectively increases the thickness of the top cover 802 in the area above the VCM 114. Increasing the thickness of the top cover 802 increases the ability of the top cover to function as the top pole of the VCM 114, by increasing the amount of magnetic flux that the top cover can accommodate. Advantageously, the accordion-like tab configuration of FIG. 8 provides an inexpensive means for reducing the overall height of a disc drive—by eliminating the need for a separate top pole—while minimizing materials and labor costs.

Alternatively characterized, a first embodiment of the present invention includes a disc drive (such as 300, 400, 600, 700, 800) that has a digital data storage disc (such as 108) rotatably mounted on a drive motor (such as 112) fastened to a base plate (such as 120) and an actuator assembly (such as 111) mounted adjacent the storage disc. The actuator assembly (such as 111) has an actuator arm (such as 115) carrying a trasducer (such as 118) at one end for transferring data to and from the disc (such as 108), and a voice coil motor (such as 114) for rotating the actuator arm (such as 115) to position the transducer (such as 118). The voice coil motor (such as 114) has a movable coil (such as 126) fastened to an opposite end of the actuator arm. A pair of stationary magnets (such as 128) is positioned adjacent the voice coil (such as 126) in a side-by-side relation. The drive drive (such as 300, 400, 600, 700, 800) also has a cover (such as 302, 402, 602, 702, or 802) on the baseplate enclosing the actuator assembly and the data storage disc, wherein a portion of the cover forms a top pole of magnetically permeable material for the pair of magnets.

The disc drive (such as 300, 400, 600, 700, 800) preferably has the pair of stationary magnets (such as 128) attached to a bottom pole (such as 129) on the base plate in spaced, confrontational arrangement with a top pole (such as 302, 402, 406, 602, 606, 702, 706, 802, 810). A horizontal gap is, thus, defined between the stationary magnets (such as 128) and the top pole and the voice coil (such as 126) rotates horizontally within the gap. A cover (such as 302, 402, 602, 702, or 802) encloses the actuator assembly and the storage disc (such as 108), wherein the top pole (such as 302, 402, 406, 602, 606, 702, 706, 802 or 810) is a portion of the cover (such as 302, 402, 602, 702, or 802) formed of a magnetically permeable material.

Another embodiment of the present invention provides a disc drive (such as 300, 400, 600, 700, 800) including a housing having a base (such as 120) and a top cover (such as 302, 402, 602, 702, 802) for enclosing a storage disc (such as 108). The top cover is formed of a folded magnetically permeable material. The disc drive also has an actuator assembly (such as 111) having a voice coil motor (such as 114) for positioning a read/write head (such as 118) with respect to the hard disc. The voice coil motor also includes a bottom pole (such as 129), a pair of stationary magnets (such as 128), and a voice coil (such as 126) forming a magnetic circuit. The voice coil (such as 126) is fastened to an actuator arm (such as 115) above the pair of stationary magnets and the top cover forms a top pole of the voice coil motor.

Stated another way, the present invention may be viewed as a housing for a disc drive (such as 300, 400, 600, 700, 800) enclosing a rotating data storage disk (such as 108) and a voice control motor operated actuator assembly (such as 111) having a top cover and a means for providing a magnetic flux return path for the voice coil motor formed in the top cover.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the top cover tab shown in the embodiments above may alternatively be comprised of magnetically permeable material such as steel pressed or sandwiched into a an otherwise non-magnetically permeable sheet metal cover substrate. The shapes of the pole portions of the tab may be different than as shown. Another set of magnets 128 may be positioned beneath the cover 302, 402, 602, 702, or 802 above the voice coil 126 to further enhance the magnetic field through which the voice coil 126 rotates. Numerous other changes may be made which will readily suggest themselves to those skilled in the art and which are encompassed in the spirit of the invention disclosed and as defined in the appended claims.

What is claimed is:

1. A disc drive comprising:

a digital data storage disc rotatably mounted on a drive motor fastened to a baseplate;

an actuator assembly mounted adjacent the storage disc, the assembly including an actuator arm carrying a transducer at one end for transferring data to and from the disc, and a voice coil motor for rotating the actuator arm to position the transducers the voice coil motor having a movable coil fastened to an opposite end of the actuator arm and a stationary magnet positioned adjacent the voice coil; and a cover on the baseplate enclosing the actuator assembly and the data storage disc, wherein a portion of the cover forms a top pole of magnetically permeable material for the magnet;

wherein the cover comprises a tab of magnetically permeable material that is bent to form a first flat portion, the first flat portion being maintained in substantially parallel alignment with a top surface of the cover and forming a portion of the top pole.

2. The disc drive of claim 1, wherein the first flat portion overlaps an area of the cover located substantially directly above the pair of stationary magnets.

3. The disc drive of claim 1, wherein the tab is further bent to form a second flat portion, the second flat portion being maintained in substantially parallel alignment with a top surface of the cover and with the first flat portion.

4. The disc drive of claim 1, wherein the cover comprises a tab forming a portion of the top pole that is bent to form a first flat portion adjacent and in substantially parallel alignment with a bottom surface of the cover.

5. The disc drive of claim 4, wherein the first flat portion has a peripheral shape that is substantially the same as a shape of the bottom pole.

6. A disc drive comprising:

a digital data storage disc rotatably mounted on a drive motor fastened to a baseplate;

an actuator assembly mounted adjacent the storage disc, the assembly including an actuator arm carrying a transducer at one end for transferring data to and from the disc, and a voice coil motor for rotating the actuator arm to position the transducer, the voice coil motor having a movable coil fastened to an opposite end of the actuator arm and a stationary magnet positioned adjacent the voice coil; and a cover on the baseplate enclosing the actuator assembly and the data storage disc, wherein a portion of the cover forms a top pole of magnetically permeable material for the magnet;

wherein the top cover comprises a tab that is bent to form a plurality of flat portions in substantially parallel alignment with a top surface of the top cover.

7. A disc drive comprising:

a digital data storage disc rotatably mounted on a drive motor fastened to a baseplate;

an actuator assembly mounted adjacent the storage disc, the assembly including an actuator arm carrying a transducer at one end for transferring data to and from the disc, and a voice coil motor for rotating the actuator arm to position the transducer, the voice coil motor having a movable coil fastened to an opposite end of the actuator arm and a stationary magnet positioned adjacent the voice coil; and a cover on the baseplate enclosing the actuator assembly and the data storage disc, wherein a portion of the cover forms a top pole of magnetically permeable material for the magnet;

wherein the magnet comprises a pair of stationary magnets in side by side relation;

wherein the pair of stationary magnets are positioned on a bottom pole fastened to the baseplate in spaced, confrontational arrangement with the top pole defining a horizontal gap between the pair of stationary magnets and the top pole through which the voice coil moves; and wherein the cover comprises a tab of magnetically permeable material that is bent to form a first flat portion, the first flat portion being maintained in substantially parallel alignment with a top surface of the cover and forming a portion of the top pole.

8. The disc drive of claim 7, wherein the first flat portion has a peripheral shape that is substantially the same as a shape of the bottom pole.

9. A disc drive comprising:

a housing including a base and a top cover enclosing a digital data storage disc, the top cover having a portion formed of a magnetically permeable material; and an actuator assembly within the housing having a voice coil motor for positioning an actuator arm carrying a read/write head with respect to the disc, the voice coil motor having a bottom pole in the housing and a pair of stationary magnets positioned in a side by side relation on the bottom pole and a movable voice coil fastened to the actuator arm above the pair of stationary magnets, wherein the portion of the top cover over the voice coil forms a top pole of the voice coil motor and wherein the portion of the top cover comprises a tab that is bent to form a first flat portion over the voice coil, the first flat portion being maintained in substantially parallel alignment with a top surface of the top cover.

10. The disc drive of claim 9, wherein the first flat portion overlaps an area of the top surface of the top cover located substantially directly above the stationary magnet.

11. The disc drive of claim 9, wherein the first flat portion overlaps an area of a bottom surface of the top cover located substantially directly above the stationary magnet.

12. The disc drive of claim 9, wherein the top cover is further bent to form a second flat portion over the first flat portion, the second flat portion being maintained in substantially parallel alignment with a top surface of the top cover.

13. A disc drive comprising:

a housing including a base and a top cover enclosing a digital data storage disc, the top cover having a portion formed of a magnetically permeable material; and an actuator assembly within the housing having a voice coil motor for positioning an actuator arm carrying a read/write head with respect to the disc, the voice coil motor having a bottom pole in the housing and a pair of stationary magnets positioned in a side by side relation on the bottom pole and a movable voice coil fastened to the actuator arm above the pair of stationary magnets, wherein the portion of the top cover over the voice coil forms a top pole of the voice coil motor and wherein the top cover comprises a tab that is folded to form at least three flat portions, each flat portion being maintained in substantially parallel alignment with a top surface of the top cover.

* * * * *